United States Patent
Münzenmayer et al.

(10) Patent No.: US 9,262,831 B2
(45) Date of Patent: Feb. 16, 2016

(54) METHOD AND DEVICE FOR JOINING A PLURALITY OF INDIVIDUAL DIGITAL IMAGES TO FORM A TOTAL IMAGE

(75) Inventors: Christian Münzenmayer, Nürnberg (DE); Christian Winter, Hildesheim (DE); Thomas Wittenberg, Erlangen (DE); Stephan Rupp, Forchheim (DE); Dietrich Paulus, Herzogenaurach (DE); Tobias Bergen, Erlangen (DE); Steffen Ruthotto, Nürnberg (DE)

(73) Assignees: FRAUNHOFER-GESELLSCHAFT ZUR FÖRDERUNG DER ANGEWANDTEN FORSCHUNG e.V., München (DE); Friedrich-Alexander-Universität Erlangen-Nürnberg, Erlangen (DE)

( * ) Notice: Subject to any disclaimer, the term of this patent is extended or adjusted under 35 U.S.C. 154(b) by 998 days.

(21) Appl. No.: 13/392,721

(22) PCT Filed: Aug. 23, 2010

(86) PCT No.: PCT/EP2010/062251
§ 371 (c)(1),
(2), (4) Date: Feb. 27, 2012

(87) PCT Pub. No.: WO2011/023657
PCT Pub. Date: Mar. 3, 2011

(65) Prior Publication Data
US 2012/0154562 A1 Jun. 21, 2012

(30) Foreign Application Priority Data
Aug. 28, 2009 (DE) .................. 10 2009 039 251

(51) Int. Cl.
*H04N 7/18* (2006.01)
*G06T 7/00* (2006.01)
(Continued)

(52) U.S. Cl.
CPC ............... *G06T 7/0028* (2013.01); *G06K 9/32* (2013.01); *G06T 3/4038* (2013.01); *G06T 7/0034* (2013.01); *G06K 2009/2045* (2013.01); *G06T 2200/32* (2013.01); *G06T 2207/10068* (2013.01)

(58) Field of Classification Search
None
See application file for complete search history.

(56) References Cited

U.S. PATENT DOCUMENTS

2007/0161853 A1* 7/2007 Yagi et al. ............... 600/109
2010/0149183 A1* 6/2010 Loewke et al. ........... 345/424
2013/0273968 A1* 10/2013 Rhoads et al. ........... 455/556.1

OTHER PUBLICATIONS

Konen et al., Real-Time Image Mosaic for Endoscopic Video Sequences, Bildverarbeitung für die Medizin, 2007, pp. 298-302.
(Continued)

*Primary Examiner* — Heather Jones
(74) *Attorney, Agent, or Firm* — McGlew and Tuttle, P. C.

(57) ABSTRACT

In a device and a corresponding method for joining a plurality of individual digital images to form a total image, a plurality of features is determined in a first individual image by means of a selection unit using a feature-based algorithm and then tracked in a second individual image by means of a tracking unit. A transformation matrix, with which the individual images are joined in an output unit to form the total image, is calculated from the determined feature correspondences in a transformation unit. The individual images can be joined in real time and with a high degree of accuracy by means of the feature-based algorithm in combination with a robust algorithm to calculate the transformation matrix.

20 Claims, 5 Drawing Sheets

(51) Int. Cl.
*G06K 9/32* (2006.01)
*G06T 3/40* (2006.01)
*G06K 9/20* (2006.01)

(56) References Cited

OTHER PUBLICATIONS

Tomasi et al., Detection and Tracking of Point Features, Technical Report CMU-CS-91-132, Carnegie Mellon University, 1991, pp. 1-20.
Mallon et al., Precise Radial Un-distortion of Images, Proceedings of 17th International Conference on Pattern Recognition, 2004.
Behrens, A., Creating Panoramic Images for Bladder Fluorescence Endoscopy, ACTA Polytechnica, Bd. 48, Nr. 3, 2008, pp. 50-54, XP007915591.
Wolberg et al., Image Registration Using Log-Polar Mappings for Recovery of Large-Scale Similarity and Projective Transformations, IEEE Transactions on Image Processing, IEEE Service Center, Piscataway, NJ, Bd. 14, Nr. 10, Oct. 1, 2005, pp. 1422-1434, XP011139126, ISSN: 1057-7149.
Szeliski, Image Alignment and Stitching: A Tutorial, 2006, Computer Graphics and Vision, vol. 2 (1), pp. 1-104, DOI: 10.1561/0600000009.
Capel et al., Automated Mosaicing with Super-resolution Zoom, 1998, Computer Vision and Pattern Recognition (CVPR '98), DOI: 10/1109/CVPR.1998.698709.
Bouguet, Pyramidal Implementation of the Lucas Kanade Feature Tracker—Description of the Algorithm, 2002, Intel Corporation, <http://robots.standford.edu/cs223b04/algo_tracking.pdf>.
Stehle et al., Camera Calibration for Fish-Eye Lenses in Endoscopy with an Application to 3D Reconstruction, 2007, Biomedical Imaging ISBI, DOI: 10.1109/ISBI.2007.357067.
Wang et al., Robust Motion Estimation and Structure Recovery from Endoscopic Image Sequences with an Adaptive Scale Kernel Consensus Estimator, 2008, Computer Vision and Pattern Recognition (CVPR'08), DOI: 10.1109/ CVPR.2008.4587687.

\* cited by examiner

METHOD AND DEVICE FOR JOINING A PLURALITY OF INDIVIDUAL DIGITAL IMAGES TO FORM A TOTAL IMAGE

CROSS REFERENCE TO RELATED APPLICATIONS

This application is a United States National Phase application of International Application PCT/EP2010/062251 and claims the benefit of priority under 35 U.S.C. §119 of German Patent Application Serial No. 10 2009 039 251.3 filed Aug. 28, 2009, the entire contents of which are incorporated herein by reference.

FIELD OF THE INVENTION

The invention relates to a method and a device for joining a plurality of individual digital images to form a total image.

BACKGROUND OF THE INVENTION

Endoscope systems are used to inspect cavities in the industrial and medical sector that are difficult to access. The restricted image field of endoscope systems makes the orientation and the coordination more difficult when inspecting the cavities, so the entire inspection process becomes significantly more complex and time-consuming. In order to extend the viewing field of endoscope systems, methods have been developed which produce a total image from a sequence of endoscopically recorded, individual digital images. The joining is also called stitching or mosaicing. The viewing field of the endoscope system is artificially extended by the joined total image, which is also called an image mosaic.

A real time-capable method for joining endoscopically recorded individual images to form an image mosaic, which is based on a calculation of the optical flow, is known from the specialist article "Real-Time Image Mosaic for Endoscopic Video Sequences" by Konen et al., published in "Bildverarbeitung für die Medizin", 2007. A vector field is called an optical flow and gives the movement direction and speed between two respective individual images for each pixel. It is assumed here that the pixel values between the individual images do not change, but merely displace. The drawback in this method is that calculation of the optical flow is laborious.

SUMMARY OF THE INVENTION

The invention is based on an object of providing a method for joining a plurality of individual digit images to form a total image, which is fast, in particular real time-capable and accurate.

This object is achieved by a method for joining a plurality of individual digital images to form a total image, comprising the steps:

providing a first individual digital image and a second individual digital image overlapping the latter,
determining a plurality of features of the first individual image, wherein the features are each allocated first feature coordinates,
determining the features in the second individual image, wherein the features are each allocated second feature coordinates,
determining a transformation matrix having at least six degrees of freedom between the individual images, in that a first part quantity of the features is selected,
a test transformation matrix is calculated from the first and second feature coordinates of this part quantity,
a quality value is determined for the test transformation matrix with a second part quantity of the features, and the transformation matrix is determined proceeding from the test transformation matrix, when the quality value fulfils a quality criterion, and joining the individual images to form a total image by means of the transformation matrix.

The method according to the invention is based on a feature-based algorithm, with which a plurality of features are determined in the first individual image and these features are $p_n^a$ again determined or followed in the second individual image. The following of the features determined in the first individual image is also called tracking. The KLT-algorithm, the Harris-Corner detector, the monotonicity operator, the SIFT algorithm (Scale Invariant Feature Transformation) or the SURF algorithm (Speeded Up Robust Features) can be used, for example, as the feature-based algorithm.

A transformation matrix, which is used to join the individual images to form the total image, is calculated from the determined and tracked features. The transformation matrix has at least six degrees of freedom and is, for example, an affine transformation matrix with precisely six degrees of freedom or a projective transformation matrix with precisely eight degrees of freedom. The transformation matrix, which moves the two individual images into one another, is calculated from the quantity of feature correspondences determined, in other words, the first and associated second feature coordinates to the features M1 to Mn. The total quantity of feature correspondences is called $$A=\{(p_1^a,p_1^b),(p_2^a,p_2^b),\ldots,(p_n^a,p_n^b)\} \quad (1)$$

$p_n^a$ are the first feature coordinates of the feature $M_n$ and $p_n^b$ are the associated second feature coordinates of the feature $M_n$.

If the basic transformation is the perspective transformation, there applies $$p^b = H_{b,a} p^b \quad (2)$$

wherein
$H_{b,a}$ is a transformation matrix with eight degrees of freedom, which connects the points $p^a=(x^a, y^a, 1)^T$ and $p^b=(x^b, y^b, 1)^T$ to one another.

Writing out the elements of the matrix H produces $$\begin{pmatrix} x^a \\ y^a \\ 1 \end{pmatrix} = \begin{pmatrix} h_{11} & h_{12} & h_{13} \\ h_{21} & h_{22} & h_{23} \\ h_{31} & h_{32} & h_{33} \end{pmatrix} \begin{pmatrix} x^b \\ y^b \\ 1 \end{pmatrix} \quad (3)$$

and the coordinates are calculated as $$x^a = \frac{h_{11}x^b + h_{12}y^b + h_{13}}{h_{31}x^b + h_{32}y^b + h_{33}} \quad (4)$$

and $$y^a = \frac{h_{21}x^b + h_{22}y^b + h_{23}}{h_{31}x^b + h_{32}y^b + h_{33}} \quad (5)$$

Simple transformation of these equations leads to $$h_{11}x^b + h_{12}y^b + h_{13} - h_{31}x^b x^a - h_{32}y^b x^a - h_{33}x^a = 0 \qquad (6)$$

and $$h_{21}x^b + h_{22}y^b + h_{23} - h_{31}x^b y^a - h_{32}y^b y^a - h_{33}y^a = 0 \qquad (7)$$

Each feature correspondence provides two homogeneous equations of this type in order to determine the nine parameters $h_{11} \ldots h_{33}$. However, the matrix $H_{b,a}$ is only clearly defined to a desired scaling factor, which is why it has eight degrees of freedom. If the homogeneous equations are divided by the element $h_{33}$, eight unknowns remain, as this element is cancelled. For this reason, a quantity of four feature correspondences is sufficient to determine the transformation matrix between two individual images.

The calculation of the transformation matrix can be carried out by means of a singular value partition. From the vectors $$h = (h_{11}, h_{12}, h_{13}, h_{21}, h_{22}, h_{23}, h_{31}, h_{32}, h_{33})^T \qquad (8)$$

$$\alpha_i = (x_i^b, y_i^b, 1, 0, 0, 0, -x_i^b x_i^a, -y_i^b x_i^a, -x_i^a)^T \qquad (9)$$

$$\beta_i = (0, 0, 0, x_i^b, y_i^b, 1, -x_i^b y_i^a, -y_i^b y_i^a, -y_i^a)^T \qquad (10)$$

the homogeneous equations can be written as $$\alpha_i^T h = 0 \qquad (11)$$

$$\beta_i^T h = 0. \qquad (12)$$

From the n feature correspondences wherein $n \geq 4$, the system matrix Q for the singular value partition can now be constructed $$Q = \begin{pmatrix} \alpha_{11} & \alpha_{12} & \cdots & \alpha_{19} \\ \alpha_{21} & \alpha_{22} & \cdots & \alpha_{29} \\ \vdots & \vdots & \vdots & \vdots \\ \alpha_{n1} & \alpha_{n2} & \cdots & \alpha_{n9} \\ \beta_{11} & \beta_{12} & \vdots & \beta_{19} \\ \beta_{21} & \beta_{22} & \vdots & \beta_{29} \\ \vdots & \vdots & \vdots & \vdots \\ \beta_{n1} & \beta_{n2} & \vdots & \beta_{n9} \end{pmatrix} \qquad (13)$$

and the homogeneous equations from equation (11) can be written as $$Qh = 0 \qquad (14)$$

The solution to this equation system is the zero space of Q. The solution is unambiguous, if four or more feature correspondences, which are not co-linear, are contained in the quantity. If more than four such correspondences exist, the solution with the smallest error squares can also be calculated with the aid of the singular value partition. The singular value partition factorizes Q in three matrices $Q = U\Sigma V^T$. The diagonal matrix $\Sigma$ contains the decreasingly sorted singular values $\sigma_1 \ldots \sigma_9$. In the case of a perfect solution there applies $\sigma_9 = 0$ and $\sigma_i \neq 0$ for $1 \leq i \leq 8$. In the case of an overdetermined equation system, there applies $\sigma_9 \approx 0$. In both cases, the corresponding last column vector of V is the solution vector. This vector contains nine elements, which produce the looked for transformation matrix if this is filled line-wise with the elements.

For the affine transformation model, the transformation matrix can be determined in a corresponding manner. As this transformation matrix only has six degrees of freedom, a quantity of at least three non-co-linear feature correspondences is sufficient here. There applies $\sigma_8 = 0$ and $\sigma_9 = 0$ and the corresponding right singular vectors are the eighth or ninth unit vectors. In the case of a perfect solution, there applies $\sigma_7 = 0$ and in the case of a solution with the smallest error squares $\sigma_7 \approx 0$. The solution is the seventh column vector from V here.

As the feature-based algorithm, because of its simplicity, in particular in endoscopically recorded individual images, because of their poor image quality, leads to incorrect allocations in the feature correspondences, in other words to incorrectly tracked features, a robust calculation of the transformation matrix is necessary. For this purpose, the so-called RANSAC algorithm (RANdom SAmple Consensus) is used, with which incorrectly allocated feature correspondences remain disregarded in the calculation of the transformation matrix. Firstly, a test transformation matrix is calculated using a first part quantity, for example a minimum part quantity of required feature correspondences. A quality value, the so-called support, is now determined for this test transformation matrix. This means that it is determined whether the test transformation matrix for a second part quantity of the features, for example for the remaining features, satisfies a predetermined quality criterion. For example, it is determined what number of features of the second part quantity satisfies the quality criterion. The features that satisfy the quality criterion are designated so-called inliers; the other features are correspondingly designated outliers. For a test transformation matrix, a feature correspondence is, for example, classified as an inlier if there applies $$\|p_i^a - hp_i^b\| \leq t \qquad (15)$$

wherein $\| \ldots \|$ designates the Euclidean distance.

This process is repeated until a test transformation matrix with an adequately high support is found or a maximum number of iterations has been run through. The final transformation matrix is then, for example, the best test transformation matrix. Alternatively, the transformation matrix can be calculated from the inliers present for the best test transformation matrix.

The feature-based algorithm therefore allows endoscopic image mosaics or an endoscopic total image of individual images to be set up, an outlier recognition for incorrectly followed or tracked features being provided by the RANSAC algorithm. The method according to the invention therefore ensures, due to the feature-based algorithm, a fast joining of the individual images and, because of the RANSAC algorithm, an accurate joining of the individual images, even if they only have a low image quality, as is the case in endoscopically recorded individual images. The method according to the invention is, in particular, real time-capable, real time-capability being taken to mean at least ten joined individual images per second when using a convention commercial PC.

A method, in which the feature coordinates are determined iteratively in different resolution stages of the individual images, allows a determination of the feature coordinates in the case of relatively large displacements between the individual images. Proceeding from a lowest resolution stage, a feature is localized and tracked, for example with sub-pixel accuracy. The result is projected into the next resolution stage, where the feature is again determined and tracked. The displacements in pixels are therefore limited to a certain amount per resolution stage.

A method, in which the features of the first individual image are determined, in that in each case a pixel window is formed from a plurality of adjacent pixels, a matrix is formed from the gradients for these pixels, the eigenvalues are calculated from the matrix, the pixel window is characterized as the feature, if the eigenvalues exceed a threshold value, and the feature is allocated first feature coordinates, and in which the features in the second individual image are determined, in that in each case an error vector is formed for the feature as a function of the gradients and the differences in the pixel values of the individual images in the pixel window, a displacement vector is calculated from the error vector and the matrix, and the feature is allocated second feature coordinates, provides a good compromise between rapidity and accuracy. In this feature-based algorithm, which is also called the KLT algorithm, the determination and tracking of the features are optimally matched to one another, as a pixel window or feature window is only characterized as a feature if the linear equation system to be solved for the tracking of the feature is stably solvable. For this purpose, a matrix is formed from the gradients to the pixels of the pixel window in the first individual image and the eigenvalues thereof calculated. The matrix has the rank 2. If the two eigenvalues exceed a predefined threshold, the pixel window is characterized as a feature, to which first feature coordinates are allocated. As the features are also called feature points, the feature coordinates are also correspondingly called point coordinates. These feature coordinates may be the pixel coordinates of one of the pixels located in the pixel window. The matrix is then used to track or determine the feature in the second individual image. For this purpose, a displacement vector is calculated from the matrix and an error vector by solving a linear equation system. The displacement vector describes the displacement of the pixel window or feature in the second individual image and applies to all the pixels of the pixel window.

The feature-based algorithm is described in detail in the specialist article "Detection and Tracking of Point Features" by Carlo Tomasi and Takeo Kanade (Technical Report CMU-CS-91-132, Carnegie Mellon University, 1991), to which reference is made here and the entire contents of which are incorporated by reference. The algorithm is also known as the KLT (Kanade-Lukas-Tomasi) tracking algorithm or as the KLT tracker or KLT algorithm. The KLT algorithm is based on the linear equation system $$G \cdot d = e \quad (16)$$

wherein

G is a symmetrical matrix with rank 2, d is a displacement vector (dx, dy) and e is an error vector.

For two respective consecutive individual images I (hereinafter also $I_a$) and J (hereinafter also $I_b$), the matrix G can be calculated by determining the gradient g from the first individual image as follows:

$$G = \int_W g g^T w \, dA \quad (17)$$

wherein g is a gradient vector to a pixel of the pixel window W, w is a weighting function for weighting the pixels of the pixel window W and dA=dx·dy is the integration differential of the double integral.

The two-dimensional error vector e is calculated from the calculated gradients g and the differences of the pixel values of the individual images in the pixel window W, as follows:

$$e = \int_W (I(x) - J(x)) \cdot g w \, dA \quad (18)$$

wherein

I(x) is the pixel value of the first individual image in the pixel x,

J(x) is the pixel value of the second individual image in the pixel x, g is the gradient vector to a pixel of the pixel window W, w is a weighting function for weighting the pixels of the pixel window W and dA=dx·dy is the integration differential of the double integral.

The double integrals in the equations (16) to (18) are to be replaced by double sums in the x- and y-direction of the image plane for discrete pixels.

When calculating the eigenvalues, two small eigenvalues indicate homogeneous image areas, while a large and a small eigenvalue stand for unidirectional features, such as, for example, edges. Two large eigenvalue indicate corners or high-frequency textures, which are features that are good to track. As the larger eigenvalue is upwardly limited by the maximum pixel values or intensity values, it is sufficient for the smaller of the two eigenvalues to be above a specific threshold. Consequently, during the feature selection, a pixel window is accepted if for the eigenvalues $\lambda_1$ and $\lambda_2$ thereof, there applies that $$\min(\lambda_1, \lambda_2) > \lambda_t \quad (19)$$

wherein $\lambda_t$ is a predefined threshold.

A method, in which the calculation of the respective displacement vector takes place iteratively, in that the individual images are displaced relative to one another by a first displacement vector, and in that a second displacement vector is calculated by means of the displaced individual images, increases the accuracy when calculating the displacement vectors. In the solution of the linear equation system (16), the displacement vector d(i) will have a residual error, as the Taylor approximation through the linear term, in other words through the gradient vector g, is only a precise solution when the pixel values linearly depend on x and y. This is not the case above all in pixel areas with high frequencies, which are well suited for following or tracking. The approximation solution for the displacement vector d(i) may, however, be used as the starting point for further iteration steps, in which the equation system (1) is again solved and a new displacement vector d(i+1) is calculated. In order to check whether this is necessary, the respective pixel window is firstly displaced by the specific displacement vector in one of the individual images. As this position generally lies between discrete pixel coordinates, new pixel values for the pixel window are calculated by means of bilinear interpolation and the error, in other words the sum of the quadratic differences of the pixel values or image intensities, is then determined therefrom. If this error exceeds a predefined tolerance value, further iteration steps are carried out, proceeding from the current displacement vector d, until the error falls below the tolerance value or a maximum number of iteration steps has been reached. Typically, less than five iteration steps are required to precisely localize the feature looked for. As, after each iteration step, the pixel values or intensity values are redetermined by linear interpolation, the displacement vector d can be calculated with sub-pixel accuracy.

A method, in which the calculation of the respective displacement vector takes place in different resolution stages of the individual images, in that a first displacement vector is calculated in a first, low resolution stage of the individual images, in that the individual images are displaced relative to one another in a second, higher resolution stage by the first displacement vector, and in that a second displacement vector is calculated by means of the displaced individual images in the second resolution stage, allows a calculation of the displacement vectors in the case of relatively large displacements between the individual images. The feature-based algorithm, because of the linear approach on which it is based, is only in a position to determine comparatively small displacements. Larger displacements can also be determined by a pyramid-based approach, in which the individual images are present in a plurality of resolution stages j. Proceeding from a lowest resolution stage, a feature is localized, for example with sub-pixel accuracy, and the position calculated by the displacement vector d(j) is projected to the next resolution stage, where it is used as the starting point for the further calculation of the displacement vector d(j+1). Thus, the algorithm approaches an exact solution for a displacement vector d with each resolution stage, wherein the displacements to be determined per resolution stage are adequately small. The algorithm can, for example, be controlled with a predeterminable search radius r, which states how large the displacements may be, which are to be recognized by the algorithm. Using the search radius, the algorithm automatically calculates the number of resolution stages and the factor of sub-samplings between two resolution stages. At the same time, a limit range is defined in the x- and y-direction, which is ignored by the algorithm in the further calculation. This is because edge regions are produced, which are undefined, by the Gaussian filter, which is applied to every resolution stage.

A method, in which a pixel window is only characterized as feature if a minimum distance from the already determined features is exceeded, ensures that the features to be tracked are distributed as homogeneously as possible over the individual images. As a result, displacements in the most varied directions can easily be tracked.

A method, in which the transformation matrix has precisely eight degrees of freedom and characterizes a projective transformation, ensures a high image quality of the total image. The projective transformation is also called a perspective transformation or homography. By means of the projective transformation, the free movement of an imaging sensor over a flat object can be modeled, or any scene, in which the movement of the imaging sensor is limited to the rotation about its own axis.

A method, in which the feature coordinates are normalized before the calculation of the transformation matrix, increases the numerical stability in the calculation of the transformation matrix.

A method, in which the normalization takes place in such a way that the feature coordinates belonging to an individual image have an average distance of $\sqrt{2}$ from a focal point, ensures a high numerical stability in connection with a high image quality of the total image. Firstly, the focal point is in each case calculated from the features of the individual images j. The focal point $C=(C_x, C_y)$ is calculated as $$c = \frac{1}{n}\sum_{i=1}^{n} p_i^j \quad (20)$$

Furthermore, for each image j, the mean distance d from the focal point can be calculated:

$$d = \frac{1}{n}\sum_{i=1}^{n} \|p_i^j - c\| \quad (21)$$

The aim is to displace the coordinate origin of the calculated features from each individual image into the focal point and to scale the features in such a way that the distance from the origin is on average $\sqrt{2}$. This takes place by multiplication by the normalization matrices $N_j$, which are calculated as follows:

$$N_j = \begin{pmatrix} \frac{\sqrt{2}}{d} & 0 & \frac{-\sqrt{2}c_x}{d} \\ 0 & \frac{\sqrt{2}}{d} & \frac{-\sqrt{2}c_y}{d} \\ 0 & 0 & 1 \end{pmatrix} \quad (22)$$

Using the normalized feature coordinates $\bar{p}_i^j$, the normalized transformation matrix $\bar{H}$ is now calculated so that there applies $$\bar{p}_i^a \cong \bar{H} \bar{p}_i^b \quad (23)$$

The non-normalized transformation matrix H can now be calculated from $\bar{H}$. There applies:

$$H = N_a^{-1} \bar{H} N_b. \quad (24)$$

A method, in which the calculation of the transformation matrix takes place in such a way that for a repetition count a first part quantity of the features is in each case selected, a test transformation matrix belonging to this part quantity is calculated, the number of features of a second part quantity is determined for the respective test transformation matrix as the quality value and these features are imaged by the test transformation matrix with a defined accuracy, the test transformation matrix with the highest number is selected, and the transformation matrix is calculated from the associated features, which is imageable with the defined accuracy, ensures a robust and accurate calculation of the transformation matrix. An optimal accuracy of the transformation matrix is achieved by the concluding calculation of the transformation matrix from all the inliers of the best test transformation matrix.

A method, in which the individual images are joined in a planar projection face, ensures a simple and efficient joining of the individual images to form the total image, which is significant, in particular for the real time capability.

A method, in which the individual image which is later in terms of time during joining is superimposed on the individual image that is earlier in terms of time, ensures simple visualization of the total image in real time. The total image is a hybrid view of a static and a dynamic fraction. The static fraction is individual images going back in time, which are superimposed by the current individual image, as a dynamic fraction. The current individual image is preferably in each case displayed in the monitor center of a monitor. The image mosaic is therefore always centered on the most current view.

A method, in which, for joining, the x-coordinate and the y-coordinate of the pixels of the displaced individual image are rounded to the nearest integral value, ensures a rapid and calculation-optimized joining of the individual images. This is significant, in particular, for joining in real time.

A method, in which the individual images are recorded by means of an endoscope system, ensures a rapid and precise joining to form a total image, even if the individual images have poor image quality. Individual images recorded by an endoscope system are generally distorted by the wide angle lenses used. In addition, the image quality is impaired by the movement of the imaging sensor and by highlight effects.

A method, in which the individual images are rectified before the determination of the features, improves the image quality of the total image. Imaging systems with lenses, in particular wide angle lenses, cause distortions in the individual images. This is also the case in endoscope systems. The rectification takes place by means of an inverse distortion model. With regard to the rectification, reference is made to the specialist article "Precise Radial Un-distortion of Images" by John Mallon and Paul F. Whelan, published in "Proceedings of 17th International Conference on Pattern Recognition", 2004, the entire contents of which are incorporated herein by reference.

A method, in which a highlight mask is set up for each individual image, in that pixel values are detected, which exceed a highlight threshold value and no features are permitted for the calculation of the transformation matrix in the highlight masks, avoids the determination and tracking of incorrect features. Endoscopically recorded individual images regularly have a large fraction of highlight as a result of the smooth and/or damp surfaces to be inspected. Highlight occurs where the light emitted by the endoscope system impinges perpendicularly on the object surface and is reflected from there. As these highlights have high pixel values or intensity values, the strongest contrasts can often be found at the limits of the highlights, so that the feature-based algorithm finds the supposedly best features here. However, these features do not belong to the scene, but are produced during the recording of the individual images and are therefore accordingly dependent on the movement of the imaging sensor with regard to their movement. As the highlight only changes slightly from individual image to individual image, the associated features can be tracked well, the RANSAC algorithm also not being in a position to eliminate them entirely. This ultimately leads to a poor transformation matrix. As highlights clearly stand out with regard to their pixel values from the remainder of the individual image, these can be recognized relatively easily by a threshold test and subsequent erosion. For each individual image, all the pixel values are compared with a highlight threshold. The pixels, the pixel values of which exceed the highlight threshold, are allocated to a highlight mask. The highlight mask thus produced is expanded by erosion. This corresponds to a morphological dilation with a round structure element. Using the binary highlight mask, features in the region thereof are excluded. For this purpose, no features are determined in the region of the highlight mask, or features determined therein are not tracked, or not used to calculate the transformation matrix.

The invention is also based on the object of providing a device for joining a plurality of individual digital images to form a total image, which is fast, in particular real time-capable, and precise.

This object is achieved by a device for joining a plurality of digital images to form a total image with
- an input unit for providing a first individual digital image and a second individual digital image overlapping the latter,
- a selection unit to determine a plurality of features of the first individual image, which is configured in such a way that the features are each allocated first feature coordinates,
- a tracking unit to determine the features in the second individual image, which is configured in such a way that the features are each allocated second feature coordinates,
- a transformation unit to determine a transformation matrix having at least six degrees of freedom between the individual images, which is configured in such a way that
  a first part quantity of the features is selected,
  a test transformation matrix is calculated from the first and second feature coordinates of this part quantity,
  a quality value is determined for the test transformation matrix with a second part quantity of the features, and
  the transformation matrix is determined proceeding from the test transformation matrix if the quality value satisfies a quality criterion, and
- an output unit to join the individual images to form a total image by means of the transformation matrix.

The advantages of the device according to the invention correspond to the advantages already described of the method according to the invention. In particular, the device can also be developed according to the method of the invention.

A device, in which a rectifying unit is provided to rectify the individual images, increases the precision in joining the individual images to form an overall image, in particular if the individual images are recorded by means of an endoscope system.

A device, in which a highlight unit is provided to determine highlight masks of the individual images, increases the precision when joining the individual images, if these contain highlights.

An endoscope system with an imaging sensor arranged on a shaft to record individual digital images and a device for joining a plurality of individual digital images to form a total image according to the invention, has a virtually extended viewing field. The endoscope system can be used in the technology for analyzing and checking components and for the documentation of faulty locations. Moreover, the endoscope system can be used in medicine for investigating hollow organs and for documenting lesions and in minimally invasive surgery.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
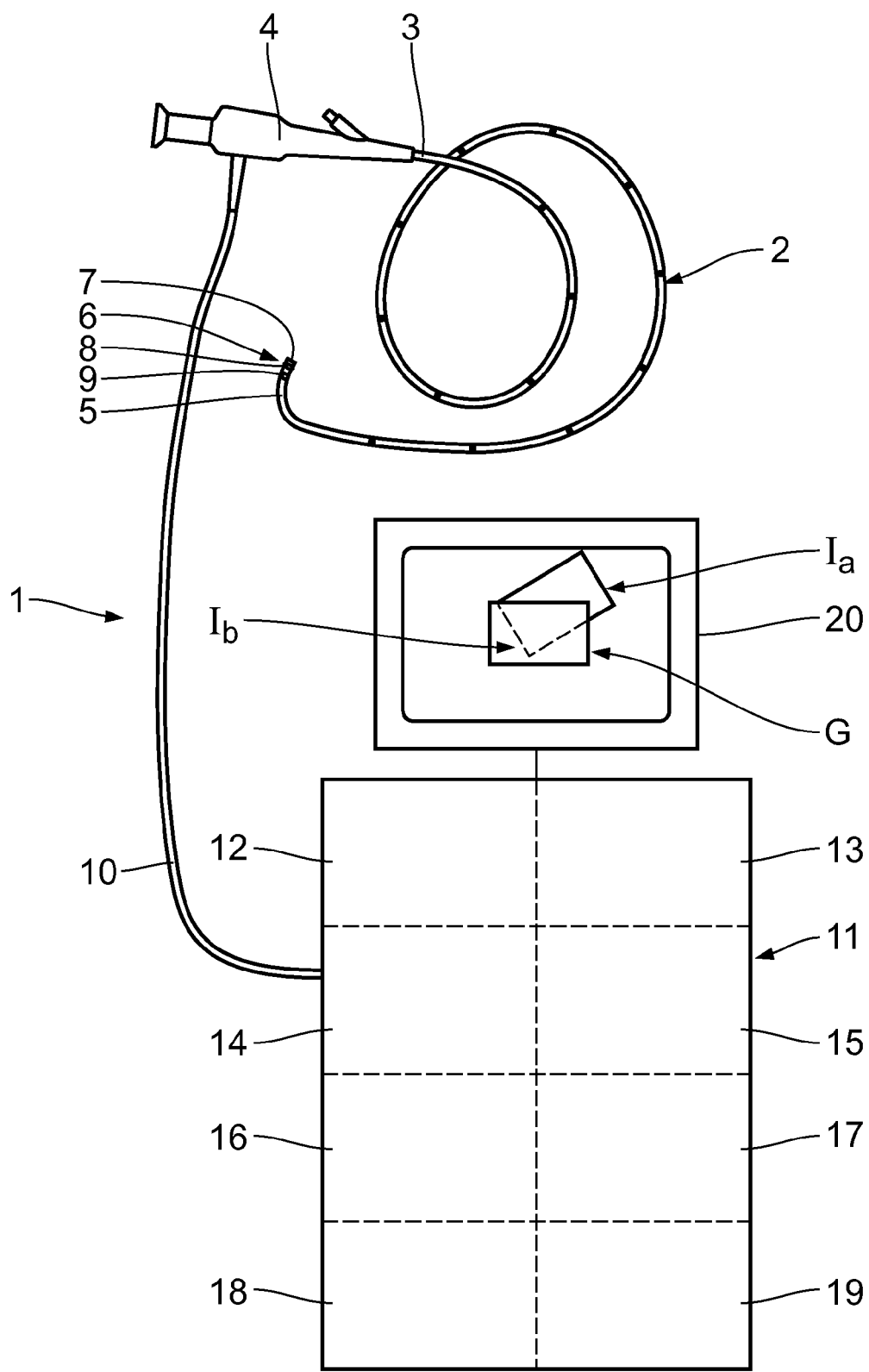
FIG. 1 is a schematic view of an endoscope system with a device for joining individual digital images to form a total image.

An endoscope system 1 has a shaft 2, on which a handle 4 is arranged on a first end 3 and an imaging system 6 is arranged on a second end 5. The shaft 2 is flexible. Alternatively, the latter may also be rigid.

The optical system 6 comprises a radiation source 7, a wide angle lens 8 and an imaging camera sensor 9. The radiation source 7 and the camera sensor 9 can be controlled by the handle 4. The imaging sensor 9 is, for example, configured as a miniaturized video sensor in Tip-Chip technology.

The individual images $I_a$, $I_b$ recorded by the sensor 9 are transmitted by a signal line 10 from the sensor 9 to a device 11, which is used to join the individual digital images $I_a$, $I_b$ to form a total image G. The signal line 10 is configured, for example, as an electric image transmission line.

The device 11 is configured as a personal computer, on which an input unit 12, a rectifying unit 13, a highlight unit 14, a selection unit 15, a tracking unit 16, a transformation unit 17 and an output unit 18 are implemented. To store data, the device additionally has a storage unit 19. To visualize the total image G, the device 11 is connected to a monitor 20.

Using the camera sensor 9, during a time interval $\Delta t$, a first individual image $I_a$ and a second individual image $I_b$ that is later with respect to time are initially recorded. The camera sensor 9 was displaced between the recording of the individual images $I_a$ and $I_b$, so that the scene located in front of the camera sensor 9 was recorded from different positions.

The individual image $I_a$ is firstly read in step $S_1$ into the input unit 12 and then rectified in the rectifying unit 13 in step $S_2$ by means of an inverse distortion model. The rectified individual image $I_a$ is stored in the storage unit 19 in step $S_3$. The rectified individual image $I_a$ is then passed to the highlight unit 14, which produces, in step $S_4$, a highlight mask $L_a$, which is stored in the storage unit 19 in step $S_5$. To produce the highlight mask $L_a$, the pixel values $p_a(x,y)$ are compared with a highlight threshold $t_1$ and those pixels are allocated to the highlight mask $L_a$, the pixel values $p_a(x,y)$ of which exceed the highlight threshold value $t_1$. This pixel range or these pixel ranges is or are then extended by morphological dilation with a round structure element and the highlight mask $L_a$ is thus formed.

The individual image $I_a$ is then fed in step $S_6$ to the selection unit 15 and the tracking unit 16, in which the feature-based algorithm, for example the KLT algorithm, is implemented. The precise mode of functioning of the KLT algorithm will be described in more detail below.

The selection unit 15 in step $S_7$ outputs n features $M_1$ to $M_n$, which were determined in the individual image $I_a$. The features $M_1$ to $M_n$ are characterized by associated feature coordinates $p_1{}^a$ to $p_1{}^a$, which are stored in the storage unit 19. The individual image $I_a$ is fed in step $S_8$ to the output unit 18, with which this is shown in step $S_9$ in a planar projection face. No joining takes place yet for the first individual image $I_a$, as no further individual image is present. The origin of the first individual image $I_a$ can be re-determined in step $S_9$. For this purpose, an origin transformation matrix $H_{a,0}$ is read out from the storage unit 19 in step $S_{10}$. In step $S_{11}$, a return is then made to step $S_1$, where the following second individual image $I_b$ is read in step $S_1$. The steps $S_2$ to $S_7$ are then repeated for the individual image $I_b$.

The features $M_1$ to $M_n$ determined in the first individual image $I_a$ are then determined in the second individual image $I_b$. This process is also called tracking or following. In step $S_{12}$, the features $M_1$ to $M_n$ and parameters for the KLT algorithm, such as, for example, a search radius r, are read from the storage unit 19 into the tracking unit 16. The mode of functioning of the tracking unit 16 will be described below in detail.

The result of the KLT algorithm, which is output by the tracking unit 16, is feature correspondences, which for each of the features $M_1$ to $M_n$ consist of the first feature coordinates $p_1{}^a$ to $p_n{}^a$ and associated second feature coordinates $p_1{}^b$ to $p_n{}^b$. The feature correspondences are accordingly $(p_1{}^a, p_1{}^b)$ to $(p_n{}^a, p_n{}^b)$. The feature correspondences are formed in step $S_{13}$, the highlight masks $L_a$ and $L_b$ entering in step $S_{14}$, so that no features M are permitted, which lie within one of the highlight masks $L_a$ or $L_b$.

In step $S_{15}$, the transformation matrix $H_{b,a}$ is calculated in the transformation unit 17. The calculation takes place in accordance with equations (1) to (24) by means of the RANSAC algorithm, for which purpose, in step $S_{16}$, parameters for the RANSAC algorithm, such as, for example, the size of the first part quantity $T_1$ and the second part quantity $T_2$ of features $M_i$ and the number N of iterations are read in. For subsequent individual images, a feature history can additionally be read in step $S_{16}$. The feature history contains all the coordinates and values of a feature over the time and may be useful when features become lost. Using the feature history, additional feature correspondences between past individual images and the current individual image can be generated in order to stabilize the total image or the production process thereof. The feature coordinates of the lost feature are further transformed by means of the transformation matrix or over a plurality of consecutive individual images by means of a plurality of transformation matrices. As a result, these features can be continued in the list of feature correspondences.

To calculate the transformation matrix $H_{b,a}$, the feature coordinates are firstly normalized and the transformation matrix $H_{b,a}$ is then calculated by means of the RANSAC algorithm. For this purpose, a first part quantity $T_1$ is selected from the total quantity of features $M_1$ to $M_n$. In the case of a projective transformation matrix, eight unknowns are to be determined, so at least four feature coordinates have to be selected in order to clearly calculate the transformation matrix $H_{b,a}$. The RANSAC algorithm carries out N-iteration steps, a first part quantity $T_1$ being randomly selected in each iteration step and a test transformation matrix T being calculated. The calculated test transformation matrix T is then checked with a second part quantity $T_2$ of features $M_i$, the part quantities $T_1$ and $T_2$ not overlapping. The number $N_I$ of the so-called inliers is used as the quality value for the respective test transformation matrix T. A feature $M_i$ of the second part quantity $T_2$ is an inlier when it can be imaged within a predefined accuracy by the calculated test transformation model. The Euclidean distance is calculated for this purpose with the test transformation matrix T. The test transformation matrix T with the highest number $N_I$ of inliers is used as the starting point to calculate the transformation matrix $H_{b,a}$ with all the features $M_i$ characterized as inliers of the second part quantity $T_2$.

If no transformation matrix is found, the individual image $I_b$ is discarded in step $S_{17}$ and a further individual image is read in step $S_{11}$. If no further individual image is present, the method ends in step $S_{18}$. If a transformation matrix $H_{b,a}$ is found, this is passed in step $S_{19}$ to the output unit 18, in which the individual images $I_a$ and $I_b$ are joined to form the total image G. The total image G is visualized by the monitor 20, the current individual image $I_b$ preferably being superimposed on the preceding individual image(s) $I_a$. The most current individual image $I_b$ is preferably shown centrally on the monitor 20.

The transformation matrix $H_{b,a}$ is stored in the storage unit 19 in step $S_{20}$. If no further individual image is present, the method ends in step $S_{18}$.

Figure 5:
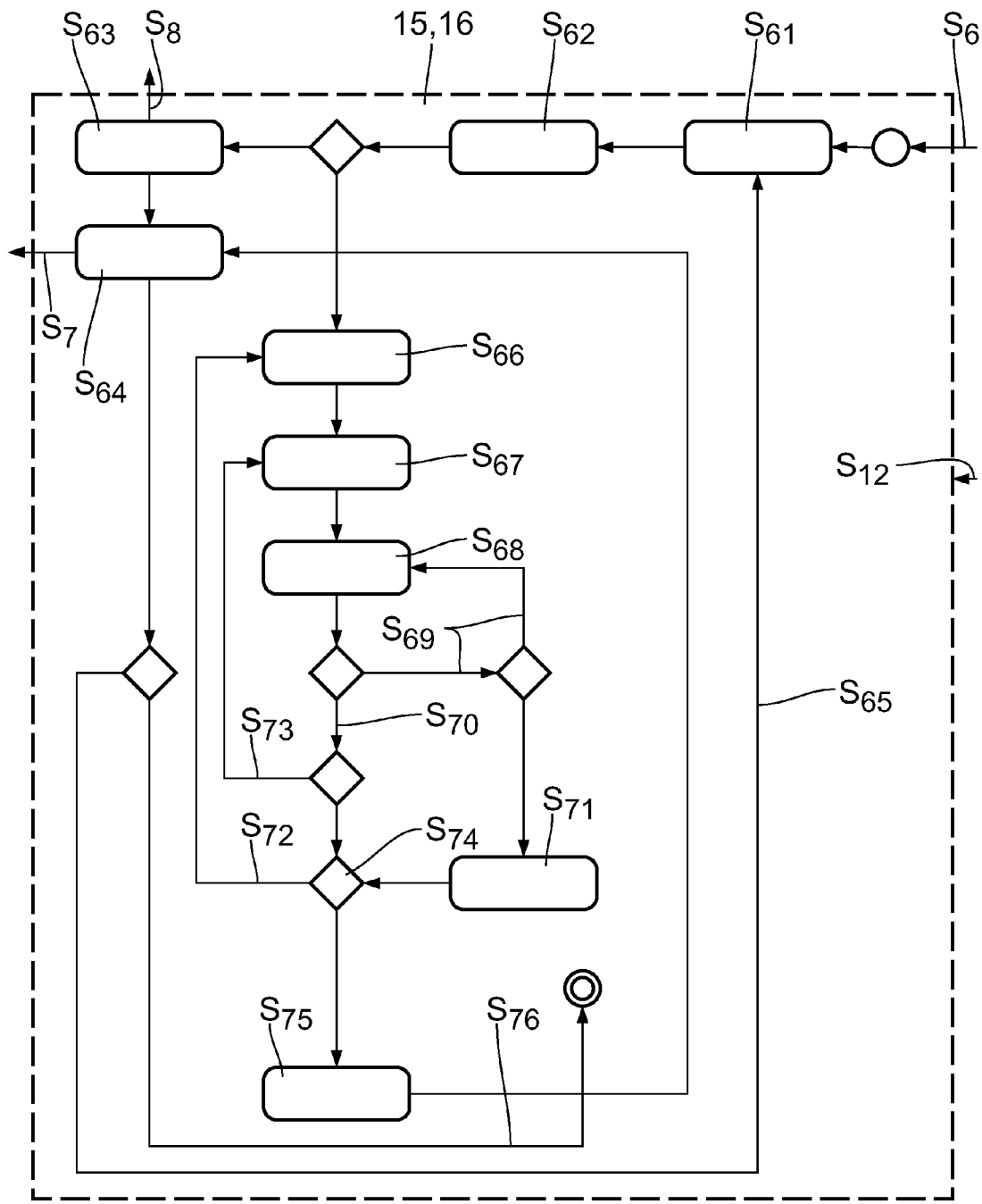
FIG. 5 is a schematic flowchart of the feature-based algorithm for determining and tracking features in the individual images.

The mode of functioning of the selection unit 15 and the tracking unit 16 will be described in more detail below with reference to FIG. 5. In step $S_6$, the individual image $I_a$ is firstly read in. The individual image $I_a$ is then smoothed in step $S_{61}$ with a smoothing filter and then a resolution pyramid is set up in step $S_{62}$ from a plurality of resolution stages j. The number of resolution stages j is calculated for example, from a predetermined search radius r.

Features $M_1$ to $M_n$ are then determined or extracted in accordance with equations (16) to (19) from the individual image $I_a$. The features $M_1$ to $M_n$ are calculated all the resolution stages j, so that they can also be tracked in the case of large displacements in the subsequent individual image $I_b$. The displacement vector is firstly determined in the lowest resolution stage and then projected into the next higher resolution stage. The displacement in pixels can therefore be limited in each resolution stage to a desired amount.

Figure 2:
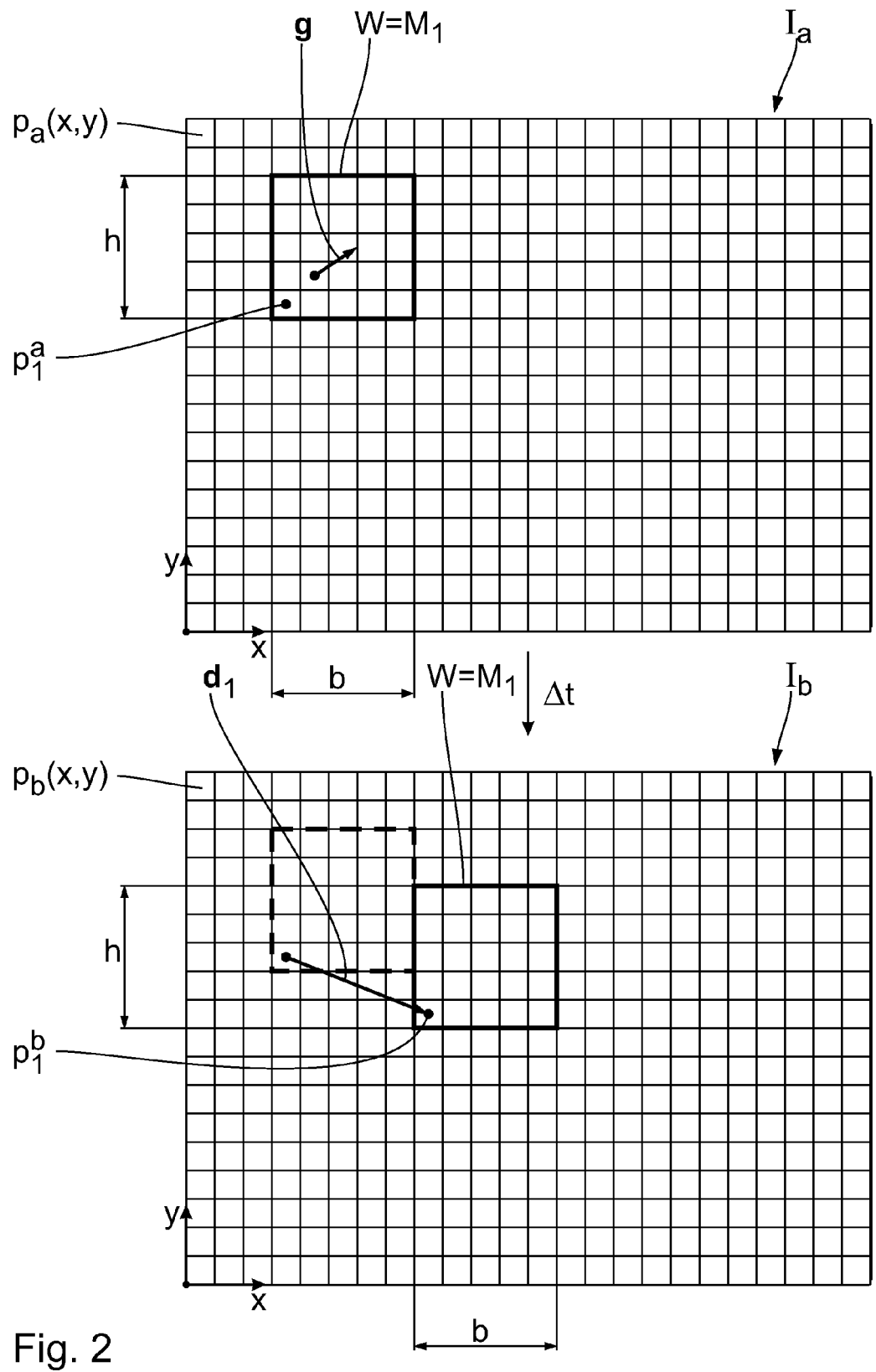
FIG. 2 is a schematic view of two consecutively recorded individual images.
Figure 3:
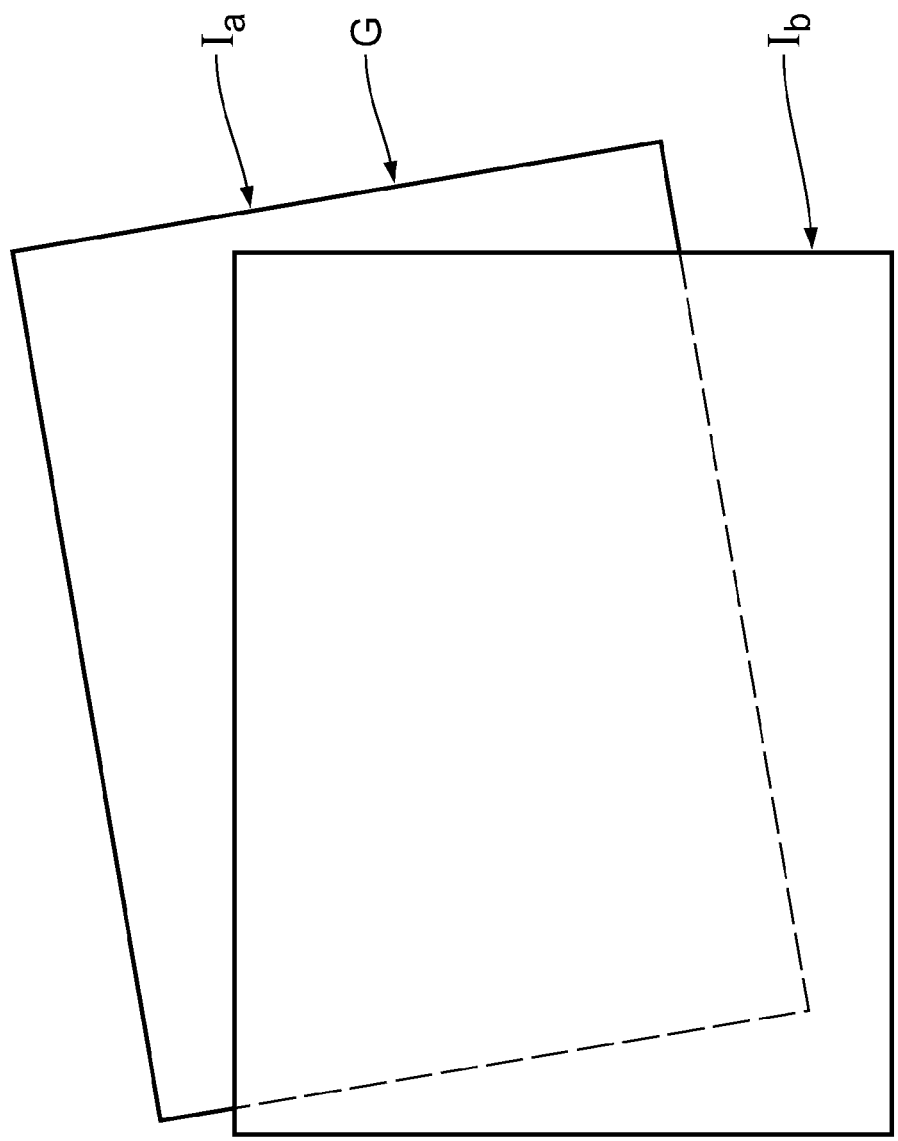
FIG. 3 is a schematic view of a total image joined from the individual images in FIG. 2.
Figure 4:
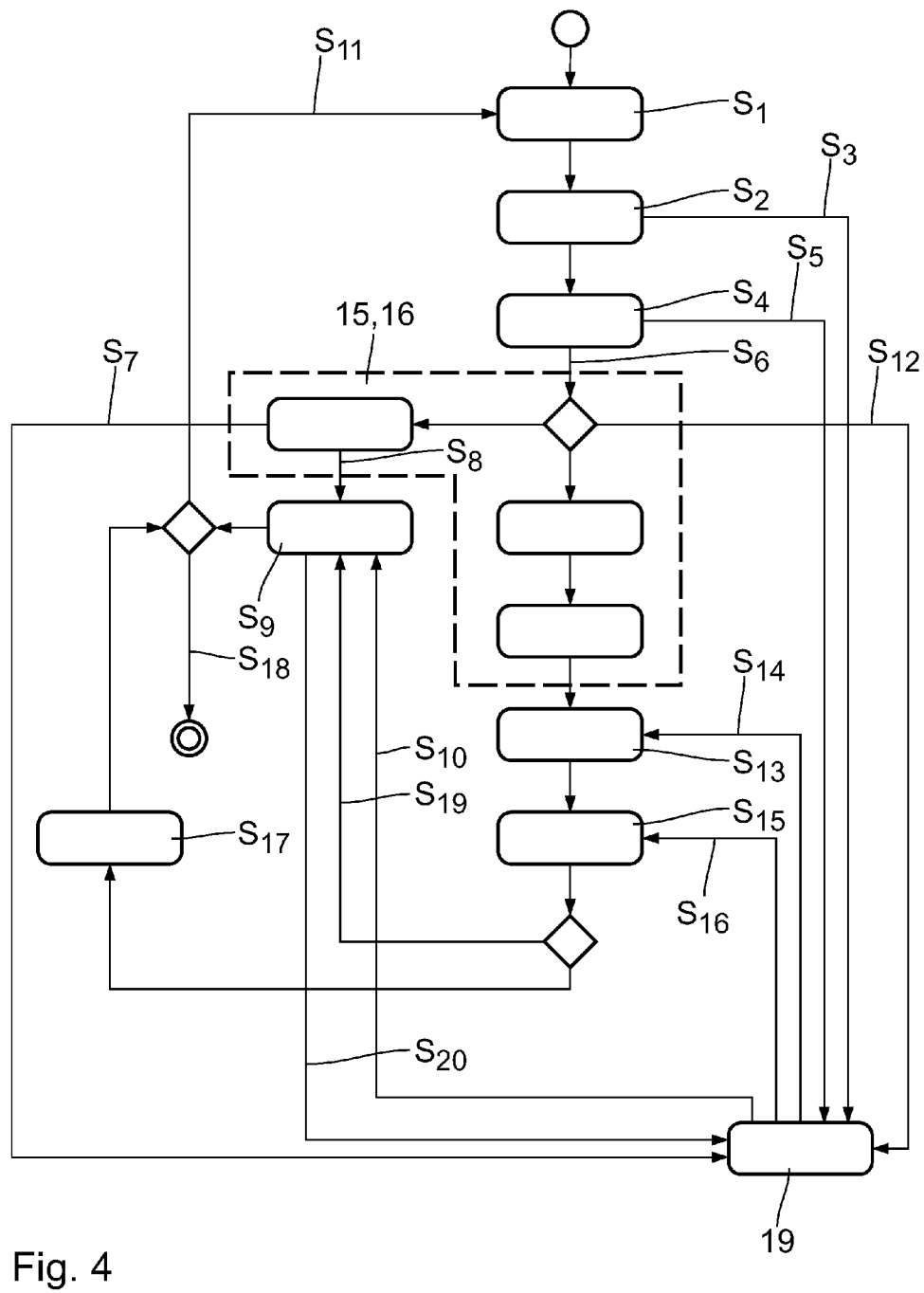
FIG. 4 is a schematic flowchart of the method for joining the individual images to form the total image.

A pixel window W with a predefined width b in the x-direction and a predefined height h in the y-direction is displaced over the individual image $I_a$ in step $S_{63}$, wherein in each or a plurality of positions of the pixel window W, a matrix G is calculated in accordance with equation (17). The matrix G is produced from the sum of the products $gg^T$ over all the pixels of the pixel window W, g being the gradient vector for a specific pixel of the pixel window W. The pixel window W of the feature $M_1$ with a gradient vector g is drawn by way of example in FIG. 2. In addition, a weighting function w can be taken into account. If this is not desired, w=1 can be selected. For each pixel window W, the eigenvalues $\lambda_1$ and $\lambda_2$ of the matrix G are calculated and a decision is made with the aid of equation (19) whether the pixel window W characterizes a feature M. In addition, a feature M being newly added has to maintain a minimum distance $\Delta M$ from the already determined features M. In step $S_{64}$, storage of the determined features $M_1$ to $M_n$ is initiated, so that the latter are transmitted to the storage unit 19 in step $S_7$. A return is then made in step $S_{65}$ to step $S_{61}$, where the second individual image $I_b$ is read in and smoothed and a resolution pyramid is set up for this in step $S_{62}$.

For the following or tracking of the features $M_1$ to $M_n$ in the tracking unit 16, these are selected one after the other in step $S_{66}$. Firstly, for the first feature $M_1$, the individual images $I_a$ and $I_b$ in the lowest resolution stage j=1 are selected in $S_{67}$. The equation system (16) is then solved for this resolution stage. The solution of the equation system (16) is the displacement vector d for the first feature $M_1$. The matrix G is already known for step $S_{68}$. The error vector e is calculated according to equation (18) in step $S_{68}$, the pixel window W being assumed in a first iteration step i=1 in the second individual image $I_b$ at a location corresponding to the first individual image $I_a$. The displacement vector d(i, j) determined in the first iteration step still has errors. For a second iteration step i=2, the pixel window P in the second individual image $I_b$ is assumed at a location displaced by the displacement vector d determined in the first iteration step. The equation system (16) is solved again with a newly calculated error vector e, the second displacement vector d determined in the second iteration step being an improved solution of the equation system (16). The described iteration step $S_{69}$ is repeated until the solution for the displacement vector d converges and the feature $M_1$ in the second individual image $I_b$ is determined in step $S_{70}$. The solving of the equation system (16) can take place by means of the Newton-Raphson algorithm. If no converging solution for the displacement vector d is found after a maximum number of iterations, the associated feature $M_1$ is discarded in step $S_{71}$ and a return is made in step $S_{72}$ to step $S_{66}$, where the next feature $M_2$ is selected.

If the feature $M_1$ is determined in step $S_{70}$, a return is made in step $S_{73}$ to step $S_{67}$, where the next highest resolution stage j=2 of the individual images $I_a$ and $I_b$ is selected. The steps $S_{68}$, $S_{69}$ and $S_{70}$ are then repeated for this resolution stage taking into account the displacement vector d determined in the preceding resolution stage. If this loop has been run through for all the resolution stages j, a check is made in step $S_{74}$ whether further features M to be determined are present. If this is the case, step $S_{72}$ is repeated. If all the features M were determined in the individual image $I_b$, lost features M are replaced in step $S_{75}$. A feature M can be lost if the latter is no longer contained in the individual image $I_b$ because of the displacement of the sensor 9, or it was discarded as unusable in step $S_{71}$. In step $S_{75}$, lost features M are replaced in such a way that the number of features M is again n. The replacement of the features M in step $S_{75}$ takes place in accordance with step $S_{63}$. A storage process is initiated for the features M to be newly added in step $S_{67}$. If further individual images are present, step $S_{65}$ is repeated. If no further individual images I are present, the KLT algorithm is left in step $S_{76}$ and a transfer is made to step $S_{13}$.

To join the individual images $I_a$ and $I_b$, the x- and y-coordinates of the pixels of the displaced individual image $I_b$ are rounded to the nearest integral value. This method is also called the "nearest neighbor" method. The following individual images can be calculated by multiplication of the current transformation matrix $H_{i,i-1}$ by the preceding transformation matrix $H_{i-1,0}$ as follows:

$$H_{i,0} = H_{i-1,0} \cdot H_{i,i-1} \quad (25)$$

Using the method according to the invention and the corresponding device 11, 6 to 25 images per second can be achieved on a PC of the type Intel Core 2 6420 with 2.13 GHz and 2 GB RAM.

While specific embodiments of the invention have been shown and described in detail to illustrate the application of the principles of the invention, it will be understood that the invention may be embodied otherwise without departing from such principles.

The invention claimed is:

1. A method for joining a plurality of individual digital images to form a total image, the method comprising the steps:

providing a first individual digital image and a second individual digital image overlapping the first individual digital image;

determining a plurality of features of the first individual image, wherein the features are each allocated first feature coordinates;

determining the features in the second individual image, wherein the features are each allocated second feature coordinates;

normalizing the feature coordinates before the calculation of a transformation matrix, wherein the normalization takes place in such a way that the feature coordinates belonging to an individual image have an average distance of $\sqrt{2}$ from a focal point;

determining the transformation matrix having at least six degrees of freedom between the individual images, wherein:

a first part quantity of the features is selected;

a test transformation matrix is calculated from the first feature coordinates and the second feature coordinates of this part quantity;

a quality value is determined for the test transformation matrix with a second part quantity of the features; and the transformation matrix is determined proceeding from the test transformation matrix, when the quality value fulfils a quality criterion; and joining the individual images to form a total image by means of the transformation matrix.

2. A method according to claim 1, wherein the feature coordinates are determined iteratively in different resolution stages of the individual images.

3. A method according to claim 1, wherein the features of the first individual image are determined, wherein in each case:
   a pixel window is formed from a plurality of adjacent pixels;
   a matrix is formed from the gradients for the plurality of adjacent pixels;
   the eigenvalues are calculated from the matrix;
   the pixel window is characterized as the feature, if the eigenvalues exceed a threshold value; and
   the feature is allocated first feature coordinates; and
   the features in the second individual image are determined, wherein in each case:
   an error vector is formed for the feature as a function of the gradients and the differences in the pixel values of the individual images in the pixel window;
   a displacement vector is calculated from the error vector and the matrix; and
   the feature is allocated second feature coordinates.

4. A method according to claim 3, wherein the calculation of the respective displacement vector takes place iteratively, wherein:
   the individual images are displaced relative to one another by a first displacement vector; and
   a second displacement vector is calculated by means of the displaced individual images.

5. A method according to claim 3, wherein the calculation of the respective displacement vector takes place in different resolution stages of the individual images, wherein:
   a first displacement vector is calculated in a first, low resolution stage of the individual images;
   the individual images are displaced relative to one another in a second, higher resolution stage by the first displacement vector; and
   a second displacement vector is calculated by means of the displaced individual images in the second resolution stage.

6. A method according to claim 1, wherein a pixel window is only characterized as feature if a minimum distance from the already determined features is exceeded.

7. A method according to claim 1, wherein the transformation matrix has precisely eight degrees of freedom and characterizes a projective transformation.

8. A method according to claim 1, wherein the calculation of the transformation matrix takes place in such a way that for a repetition count:
   a first part quantity of the features is in each case selected;
   a test transformation matrix belonging to said first part quantity is calculated;
   the number of features of a second part quantity is determined for the respective test transformation matrix as the quality value and the features of said second part quantity are imaged by the test transformation matrix with a defined accuracy;
   the test transformation matrix with the highest number is selected; and
   the transformation matrix is calculated from the associated features, which is imageable with the defined accuracy.

9. A method according to claim 1, wherein the individual images are joined in a planar projection face.

10. A method according to claim 1, wherein the individual image which is later in terms of time during joining is superimposed on the individual image that is earlier in terms of time.

11. A method according to claim 1, wherein, for joining, the x-coordinate and the y-coordinate of the pixels of the displaced individual image are rounded to the nearest integral value.

12. A method according to claim 1, wherein the individual images are recorded by means of an endoscope system.

13. A method according to claim 1, wherein the individual images are rectified before the determination of the features.

14. A method according to claim 1, wherein a highlight mask is set up for each individual image, wherein pixel values are detected, which exceed a highlight threshold value and no features are permitted for the calculation of the transformation matrix in the highlight masks.

15. A method according to claim 1, wherein the transformation matrix is calculated via a RANSAC algorithm after the feature coordinates are normalized.

16. A device for joining a plurality of digital images to form a total image, the device comprising:
   an input unit for providing a first individual digital image and a second individual digital image overlapping the first individual digital image;
   a selection unit to determine a plurality of features of the first individual image, which is configured in such a way that the features are each allocated first feature coordinates;
   a tracking unit to determine the features in the second individual image, which is configured in such a way that the features are each allocated second feature coordinates;
   a transformation unit to determine a transformation matrix having at least six degrees of freedom between the individual images, which is configured in such a way that:
      the feature coordinates are normalized before the calculation of the transformation matrix, wherein the normalization takes place in such a way that the feature coordinates belonging to an individual image have an average distance of $\sqrt{2}$ from a focal point;
      a first part quantity of the features is selected;
      a test transformation matrix is calculated from the first feature coordinates and the second feature coordinates of the first part quantity;
      a quality value is determined for the test transformation matrix with a second part quantity of the features; and
      the transformation matrix is determined proceeding from the test transformation matrix if the quality value satisfies a quality criterion; and
   an output unit to join the individual images to form a total image by means of the transformation matrix.

17. A device according to claim 16, wherein a rectifying unit is provided to rectify the individual images, the transformation matrix being calculated via a RANSAC algorithm after the feature coordinates are normalized.

18. A device according to claim 16, wherein a highlight unit is provided to determine highlight masks of the individual images.

19. An endoscope system, comprising:
   an imaging sensor arranged on a shaft to record individual digital images;
   a device for joining a plurality of individual digital images to form a total image with an input unit for providing a first individual digital image and a second individual digital image overlapping the first individual digital image;

a selection unit to determine a plurality of features of the first individual image, which is configured in such a way that the features are each allocated first feature coordinates;

a tracking unit to determine the features in the second individual image, which is configured in such a way that the features are each allocated second feature coordinates;

a transformation unit to determine a transformation matrix having at least six degrees of freedom between the individual images, which is configured such that:
  the feature coordinates are normalized before the calculation of the transformation matrix, wherein the normalization takes place in such a way that the feature coordinates belonging to an individual image have an average distance of $\sqrt{2}$ from a focal point;
  a first part quantity of the features is selected;
  a test transformation matrix is calculated from the first feature coordinates and the second feature coordinates of the first part quantity;
  a quality value is determined for the test transformation matrix with a second part quantity of the features; and
  the transformation matrix is determined proceeding from the test transformation matrix if the quality value satisfies a quality criterion; and an output unit to join the individual images to form a total image by means of the transformation matrix.

20. An endoscope system according to claim 19, wherein the transformation matrix is calculated via a RANSAC algorithm after the feature coordinates are normalized.

\* \* \* \* \*